United States Patent

[11] 3,628,867

| [72] | Inventor | Tyson H. Brady |
| | | Bellingham, Mass. |
| [21] | Appl. No. | 851,638 |
| [22] | Filed | Aug. 20, 1969 |
| [45] | Patented | Dec. 21, 1971 |
| [73] | Assignee | Anacon, Inc. |
| | | Ashland, Mass. |

[54] REFRACTOMETER
20 Claims, 11 Drawing Figs.

[52] U.S. Cl. .................................................. 356/136, 250/218
[51] Int. Cl. ........................................................ G01n 21/46
[50] Field of Search ........................................... 250/218; 356/128, 130–137, 181

[56] References Cited
UNITED STATES PATENTS

| 2,483,102 | 9/1949 | Pierson | 356/134 X |
| 2,747,455 | 5/1956 | Spracklen et al. | 356/132 |
| 2,780,131 | 2/1957 | Lanneau et al. | 250/218 X |
| 2,885,923 | 5/1959 | Simmons | 356/136 |
| 3,323,410 | 6/1967 | Waters | 356/136 |

OTHER REFERENCES

The Electron Machine Corporation Brochure: " Model BL–168 In–Line Solids Analyzer," 1968

Primary Examiner—Ronald L. Wibert
Assistant Examiner—F. L. Evans
Attorney—J. N. Williams ABSTRACT: A critical angle refractometer for measuring the refractive index of a liquid of the type having a light source arranged to direct a light beam through a prism to a prism-liquid interface, and a detector for receiving light reflected from the interface and producing a signal indicative of the position of the critical angle, is improved by having mounting structure providing linear guides spaced from the prism and extending substantially parallel to the outer surface of the prism, a carrier member for the detector, and adjusting means for moving the carrier member along the guides, thereby moving the detector in a path substantially perpendicular to the mean reflected light path from the prism. Where moving streams are being monitored, structure is provided for directing the stream at and away from the prism face at acute angles thereto and establishing a continuously moving liquid stream across the prism face therebetween. A novel sample-type refractometer is also described.

REFRACTOMETER

This invention relates to critical angle refractometers.

It is an object of this invention to provide an improved optical assembly for critical angle refractometers, useful in both in-line and sample-type refractometers, which is simple, compact, simple to manufacture, easily and accurately calibrated and zeroed, and useful over a wide range of materials without disassembly of the apparatus.

Other objects are to provide an in-line refractometer capable of continuously monitoring the refractive index of a liquid stream without interfering with the liquid processing, or flow rate; which is durable, and resistant to scumming; and which is useful for accurately monitoring the densities of corrosive and dense liquids without danger, of foods and pharmaceuticals without promoting bacterial growth or adversely affecting sanitary conditions, and of very hot liquids, without adversely affecting the heat-sensitive detector materials.

Another object is to provide a sample-type refractometer which is accurately and easily filled, and is simple, leak proof, economical and easy to operate (and hence useful, e.g., as a student laboratory refractometer).

Critical angle refractometers measure the refractive index of a liquid by determining the critical angle at which light is reflected through a prism by a prism surface adjacent the liquid. They comprise a prism having a surface exposed to the liquid, a light source arranged for directing a light beam through the prism to the prism-liquid interface, a detector for receiving light reflected from the interface, and readout means for generating an electrical output corresponding to the refractive index of the liquid.

The invention features a mounting structure providing linear guides, and a carrier for the detector mounted in the linear guides for adjustably moving the detector in a path perpendicular to the mean reflected light path from the prism to the detector to reach a position where the light strikes the detector elements to give a reading. Thus, a single prism may be used with liquids having a wide range of refractive indices without loss in sensitivity in rezeroing the instrument.

In a preferred embodiment, the detector is mounted on a member having spaced-apart legs (advantageously, segments of a cylinder) straddling the prism and a platform supported on the legs and defining the linear guides. In the open space between the legs the light source is positioned and a light path from source to prism and from prism back to detector is defined. The carrier member is adjusted relative to the prism by a threaded member parallel to the linear guides retained by the mounting structure and threaded through an opening in a part of the carrier member.

Preferably, the refractometer includes a base mounting plate for the prism and the detector mounting structure is secured to this plate, legs straddling the prism. An aperture in the plate passes light reflected from the prism between the legs to the detector. The light source is mounted on another plate, straddled by the detector mounting legs and secured to the base plate. It also has an aperture for light passing from the prism to the detector. This light source mounting plate is also provided with adjusting structure for moving the light source in the same direction as the detector (e.g., for adjusting the light source after the prism size is changed).

The refractometer preferably includes a mounting structure for the detector of heat-conductive material (such as metal) and a cooling fluid conduit arranged to contact the mounting structure between the liquid being measured and the carrier member in order to conduct heat away before reaching the detector. The carrier member for the detector is preferably also a heat-conductive material and is in heat-conductive contact with the cooled structure so that heat radiating from the liquid to the carrier member is immediately conducted away from the detector. The linear guides and the adjusting screw, when of heat-conductive material, can perform this function. By these provisions it is found that the heat-sensitive light-detecting materials of the detector remain functional even when very hot fluids are being tested by the refractometer.

The invention features, in an in-line refractometer for continually measuring the refractive index of a liquid stream, a prism exposed to the light stream by an upstream liquid-carrying conduit leading from an inlet to the prism surface at an acute angle, and an opposite downstream liquid-carrying conduit which extends away at a substantially equal and oppositely directed acute angle from the prism surface to an outlet. The prism surface provides a deflecting surface for redirecting liquid flow from the upstream to the downstream paths through a flow path across the prism surface. By this provision not only may fluid-flow restriction and losses be prevented, but also continual replenishment of well-mixed fluid and avoidance of corners, crevices or other "hang-up" zones for the fluid can be avoided.

Preferably a conical wall section having the prism surface secured across its apex is located to receive the flow from the inlet and, after detection, to divert it to the outlet.

In a preferred construction, the liquid inlet and outlet are defined by coaxial flanges and a wierlike wall is located opposite the prism surface and spaced therefrom to divert liquid against the prism and to receive liquid flow after detection and rediversion.

Advantageously, a structure previously used as a valve body of a diaphragm-type valve can be employed to form a major part of the flow structure. In this "valve body" the upstream and downstream conduits are formed in an integral diverting structure, each conduit including a flange defining an opening of circular cross section communicating with the inlet and outlet, respectively, and gradually flattening outer and inner walls in the direction of the center. The conduits terminate in their outer walls in a common portion of circular cross section perpendicular to and of greater diameter than either of the upstream and downstream flanges, and terminate in their inner walls in a wierlike diverter member. To the "valve body" structure the conical wall section is secured.

Refractometers featuring diverting surfaces and cooling structure as described permit measurements of fluid at temperatures into the 350° C. range and viscosities in the 100,000 cp. range. Such refractometers may readily be constructed to provide continuous forward liquid flow in all portions of the total liquid stream, so that the refractometer will be useful for, e.g., continually sampling the refractive index of foods, without providing any crevices in which food particles might stick with resulting undesireable bacteria growth.

In still another aspect, this invention features a laboratory-model refractometer which includes a sample holder for maintaining the liquid sample upon the prism surface and a closure member for forming with the holder and the prism surface a stray light-impermeable chamber for the liquid sample, so that all of the light reflected back from the prism originates from the light source. A preferred sample holder defines an interior frustoconical bore, having the prism surface located at and sealed to the apex of this bore. For use therewith, the closure member includes a resilient cap which has an outer surface shaped to press-fit into the aforesaid conical bore to form a lighttight seal above the liquid. The resilient cap may also be formed with a lower conical portion having an apex parallel to the prism surface and sized to be spaced slightly therefrom, with an outer wall matching the adjacent sample holder wall, and an upper cylindrical portion forming a channel for excess liquid sample squeezed out from between the parallel apex and prism surfaces and the matching conical surfaces. The mounting structure for the closure means includes a retractable arm together with biasing means which bias the closure member against the holder to form the stray-light impermeable chamber. This retractable arm may be pivotably mounted on a bridge member remote from the sample holder and arcuately retractable from the sample holder, with the biasing means constructed to be inoperative when the arm is thus arcuately retracted from the sample holder.

Other objects, features and advantages will occur to one skilled in the art from the following description of preferred embodiments of the invention, taken together with the attached drawings thereof, in which:

FIG. 10 is an exploded view of the detector, source and prism mounting structures; and, FIG. 11 is a schematic illustration of the detector adjustability achieved in the present invention.

Figures 1, 2:
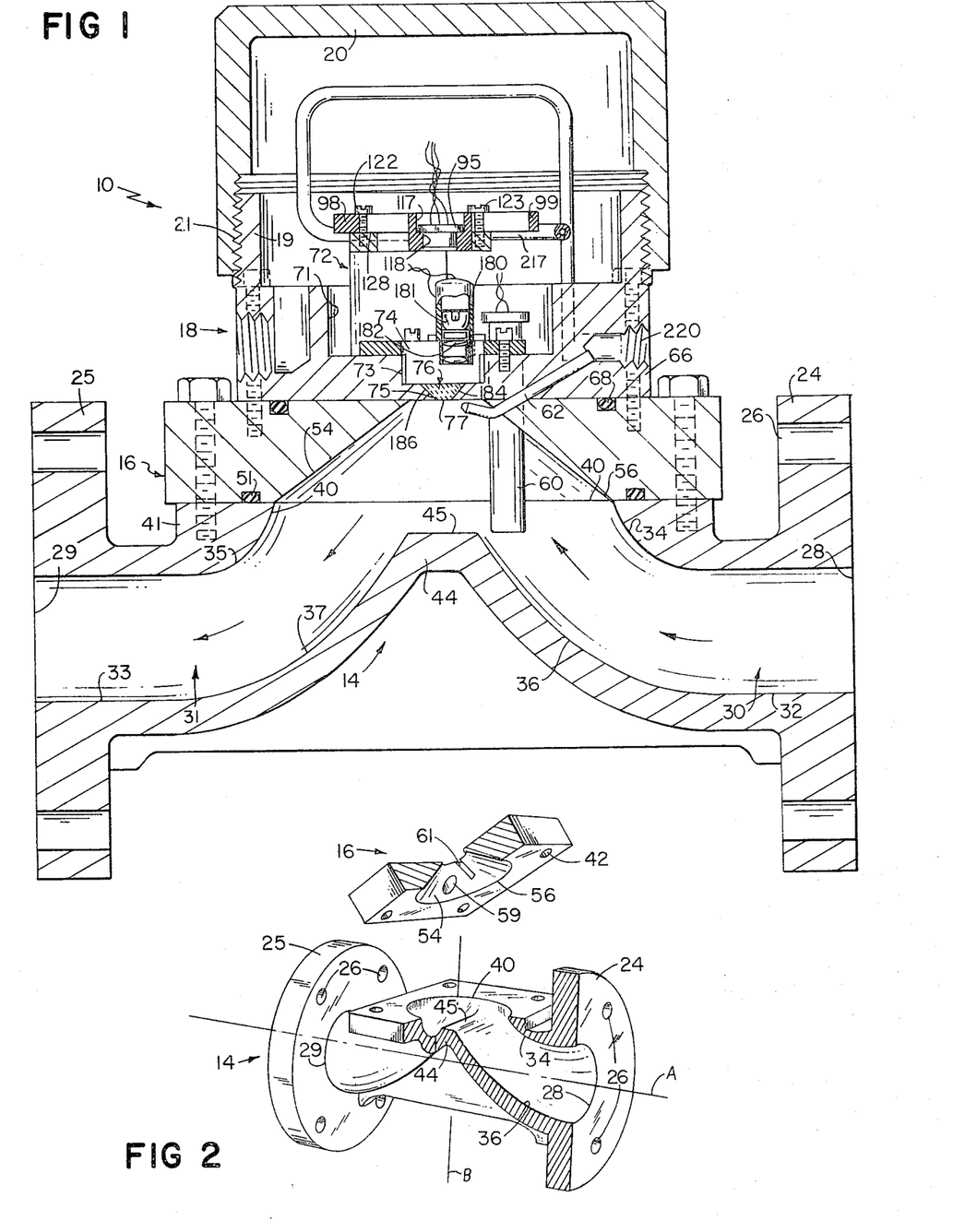
FIG. 1 is a sectional view of a refractometer embodiment of the present invention for continuously monitoring the refractive index of a moving liquid stream, except that the light source is only partially broken away and the detector is shown in full.
FIG. 2 is an exploded, partially sectional view, somewhat reduced in size, of structure defining the liquid stream flow path in the embodiment of FIG. 1.

In FIG. 1, there is shown a refractometer 10 for measuring the refractive index of a moving liquid stream (the direction of which is indicated by arrows), which comprises, broadly, a wierlike liquid-directing member 14, an adapter plate 16, an optical assembly 18 having an exterior threaded cylindrical wall 19, and a cylindrical cap 20, secured to wall 19 by an interior threaded portion 21. The liquid-directing body and its relation to the prism will first be discussed, and then the other components of the instrument.

Referring to FIGS. 1 and 2, liquid-directing body 14 includes two opposed mounting flanges 24, 25, each including bolt holes 26 for fastening into a liquid process line (not shown). The construction of member 14 is such as not to interfere with the volume flow of liquid through the process line, being in the form of a "valve body" known to the valving art.

Flange 24 defines liquid inlet 28, and flange 25 defines outlet 29, coaxial with inlet 28 on axis A. Each leads, respectively, to an interior upstream liquid supply conduit 30 and an interior downstream liquid return conduit 31. Each conduit has gradually flattening outer walls 34, 35, and inner walls 36, 37, respectively, the outer walls 34, 35 terminating in central opening 40 of circular cross section greater than the cross section of either of inlets 28, 29, and centered on axis B, perpendicular to axis A. Opening 40 is formed in rectangular-shaped mounting plate 41, that has a bolt hole 42 at each corner. Inner walls 36, 37 of body 14 terminate in a diverter member 44, having an upper edge 45 generally parallel to the plane of opening 40 and slightly spaced therefrom.

To mounting plate 41 of body 14 is bolted adapter plate 16, compressing O-ring 51, to prevent liquid escape. Adapter plate 16 includes a frustoconical bore 54 having a base 56 approximately of equal diameter with opening 40. An aperture 59 is formed in the conical wall for receiving a temperature probe 60 for monitoring the temperature of incoming liquid, whereas a slot 61, of rectangular cross section, is for receiving a washing conduit 62.

Optical assembly 18 includes a mounting plate 66, which is bolted (and made liquidtight by O-ring 68) to adapter plate 16. Mounting plate 66 includes a cylindrical bore 71, in which is positioned detector mounting structure 72, see FIG. 4. Another smaller cylindrical bore 73 is provided at the bottom of bore 71, and there is positioned therein a light-source mounting disc 74. Frustoconical prism 76 (made, e.g., of spinel) is positioned in frustoconical bore 75. Prism 76 has a liquid-contacting planar surface 77 exposed through bore 75 to the liquid stream.

Figure 3:
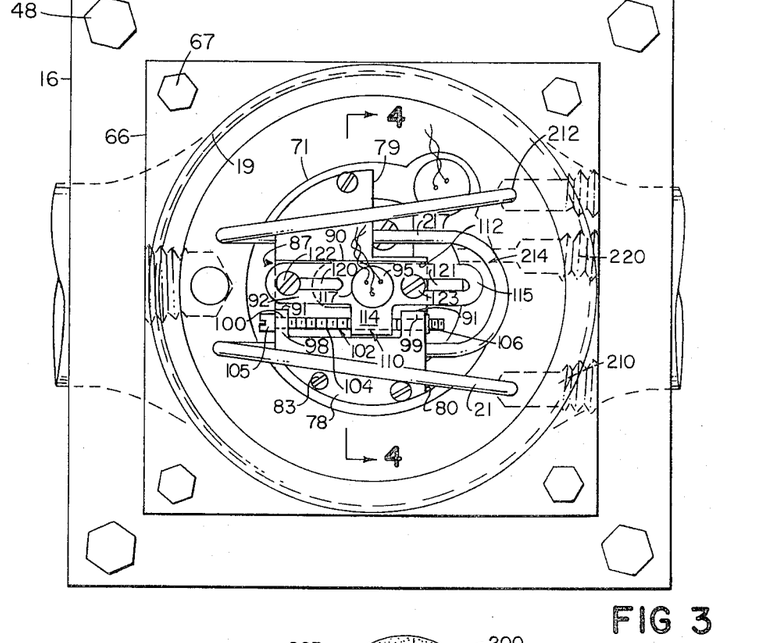
FIG. 3 is a top view of the embodiment of FIG. 1, with the cap removed.

Detector mounting structure 72 (see particularly FIGS. 3, 5, and 10) includes a mounting platform 78, and two legs 79, 80, each in the form of a segment of a cylinder, and is secured by fasteners 83 on mounting plate 66 (having threaded openings 85). Elongated slot 87 in the top surface 88 of mounting platform 78 is defined by opposed parallel guide walls 90 and 91; aperture 92 is sized to expose the light-receiving face of detector 95 therethrough to prism 76. Guide wall 91 is defined by flanges 98, 99, which have unthreaded holes 100, 101, respectively, therethrough, for supporting adjusting screw 102, which has a threaded portion 104, and is prevented from axial movement by a slotted (adjusting) head 105, and an opposite snap ring 106.

Figures 10, 11:
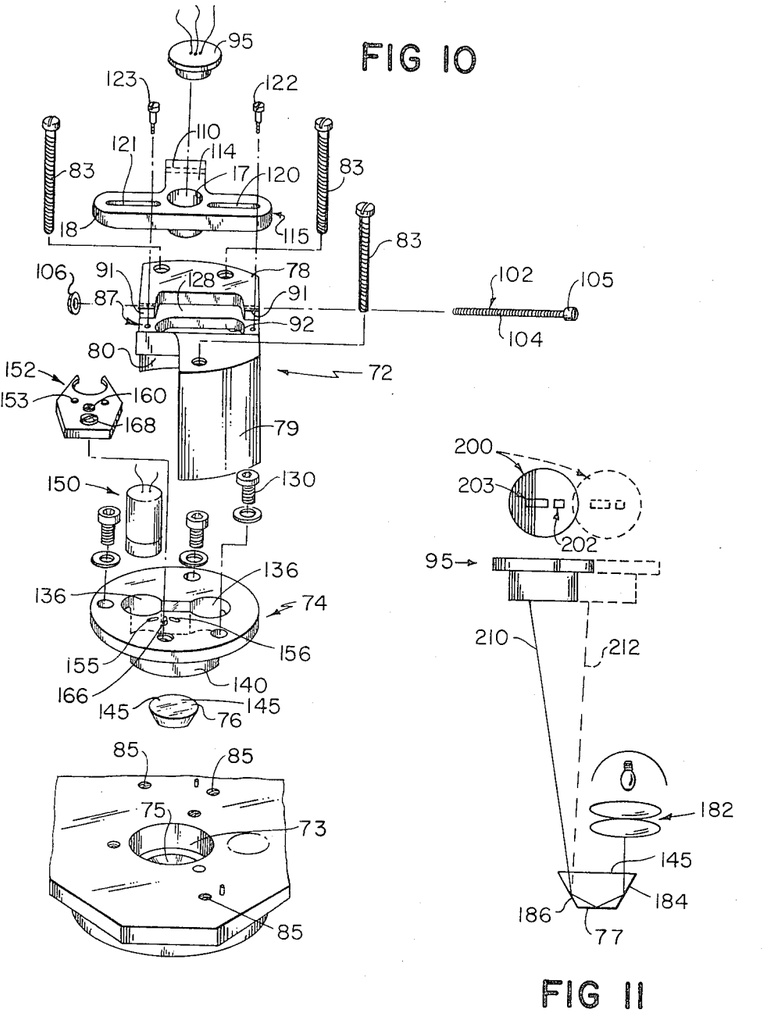

Threaded portion 104 extends through a threaded opening 110 in flange 114, of carrier member 115. The central aperture 117 of carrier member 115 defines therearound an annular shoulder 118 sized to support a detector thereon, and elongated slots 120, 121 receive locking screws 122, 123 therethrough into threaded openings in the bottom surface 128 of elongated slot 87, which are tightened, after proper adjustment of carrier member 115 by adjusting screw 102.

Figures 4, 5, 6:
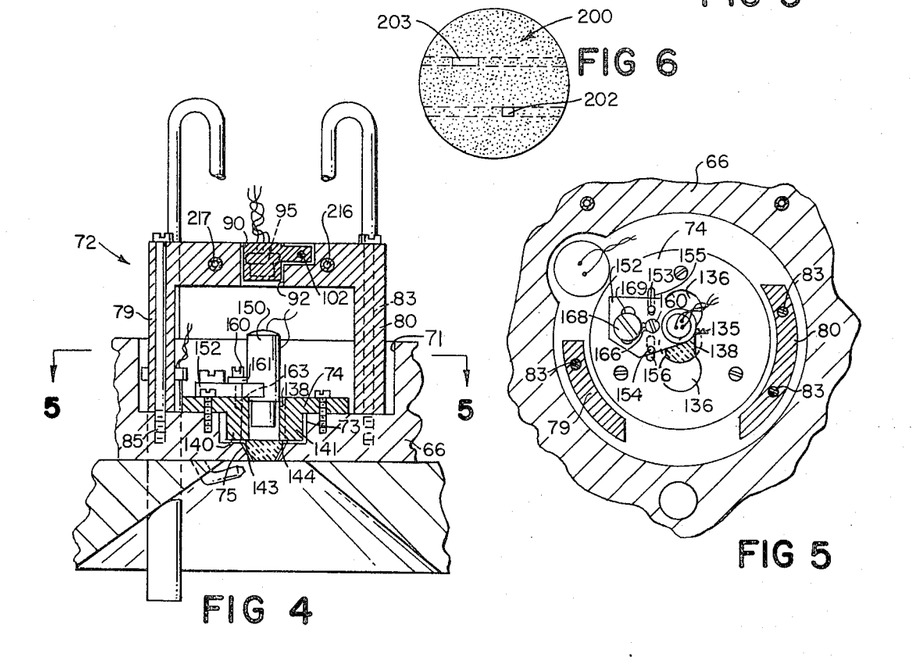
FIG. 4 is a sectional view of the embodiment of FIG. 1 along line 4—4 of FIG. 3.
FIG. 5 is a top-sectional view of the embodiment of FIG. 1 along line 5—5 of FIG. 4, showing particularly the light source mounting plate.
FIG. 6 is a schematic view of an illustrative detector face.

Light-source mounting disc 74 is bolted to mounting plate 66 and includes a central opening 135 which has two portions 136 of generally circular cross section, connected by two parallel sides 138. Arcuate legs 140, 141 extend into bore 73 of mounting plate 66, and have lower surfaces 143, 144 which engage peripheral portions of the face 145 of prism 76 to hold and seal the prism in place with its reflecting surface exposed to liquid. Light source 150 is secured in adjusting plate 152, which has two pins 153, 154 extending, respectively, into elongated slots 155, 156 in disc 74, spaced to permit movement of light source 150 in the same linear manner as detector 95. Eccentric pin 160 has an upper portion 161 in plate 152, and a lower portion 163, eccentrically located and of reduced diameter, residing in elongated slot 166, which is oriented at right angles to slots 155, 156. A locking screw 168, extending through slot 169 into a threaded opening in disc 74, is tightened to lock the plate and disc together after plate 152 is adjusted by eccentric pin 160.

As can be seen in FIG. 1, light source 150 includes a bulb holder 180 supporting an incandescent bulb 181, and two double convex lenses 182, for delivering a light beam to one side 184 of prism 76, from whence it is reflected to prism face 77 back to opposite side 186, and thence to detector 95.

Detector face 200 supports a pair of photosensitive transducers 202, 203, preferably in the form of layers of cadmium sulfide, bonded to a dielectric substrate. The resistance of the cadmium sulfide, which is photosensitive (dependent on total light impinging thereon) is read out by appropriate electrical means (not shown). According to the usual practice, a black mask is used to mask most of the photosensitive areas. The detector is then aligned, by adjusting carrier member 115, so that reference transducer 202, which is one-half the size of sampling transducer 203, is in the region of total light reflection, and hence is always totally illuminated, whereas the critical angle falls on sampling transducer 203, which will therefore have adjacent light and dark areas, the relative sizes depending on the position thereon of the critical angle, which is in turn dependent on the refractive index of the liquid being monitored.

The cooling system for keeping heat from the photosensitive face of detector 95 includes cooling liquid (e.g., water) inlet 210, and outlet 212, connected by conduit 214 which includes two portions 216, 217 extending through the interior of platform 78, perpendicular to legs 79, 80 for intercepting heat conducted up metallic legs 79, 80, before it reaches detector 95. In addition, radiant heat approaching detector 95 from the space between legs 79, 80 can be conducted away through metallic carrier member 115 and locking screws 122, 123 or by adjusting screw 102, to the cooling conduits.

A second water inlet 220 directs water to washing conduit 62 for flushing the exposed face 77 of prism 76.

Temperature probe 60 is for monitoring the temperature of the incoming liquid, and may be in the form of a thermistor, transistor, or other temperature sensor which generates a temperature-dependent electrical signal. Since the refractive index of a liquid is temperature dependent, any change in temperature of the sample liquid relative to the temperature of a standard liquid for which the detector has been calibrated must be compensated if the refractometer is to produce a signal dependent solely on variance in the refractive index.

In operation, a liquid mainstream is directed, through conduit 30, at an acute angle to prism face 77, flows turbulently across face 77, and is directed in mainstream away at an equal but opposite acute angle by outlet conduit 31. Because of the turbulent changing direction of the flow of liquid across prism face 77, a liquid sample at the interface of face 77 and the liquid stream will be continuously changing. Continuous flow is also promoted by the streamlined configuration of all of the liquid-contacting surfaces, so that, particularly where high-solids content liquids are being monitored (e.g., foods), no solids buildup or laminar flow regions will be created. The prism face is periodically rinsed by directing a cleansing liquid through conduit 62.

At some previous time, one or two reference liquids are directed through these conduits in order to properly position transducer 203 of detector 95 for monitoring the critical angle. For example, a single liquid having a desirable refractive index is led through the conduits, and carrier member 115 is moved to position the dividing line between the light and dark areas of the reflected light beam at the midpoint of transducer 203. A readout circuit for measuring the total resistance of transducer 203 may be nulled for this halfway calibration. Then, any deviation above or below the desired refractive index would produce a signal. Or, if it is desired only to have a maximum or minimum refractive index, the dark-light dividing line could be set near or at one end of the transducer, and the readout circuit nulled. Then, only changes of refractive index surpassing the minimum or maximum would produce a signal, whereas changes in the other direction would produce no signal. The mounting structure for the detector makes possible changes substantially perpendicular to the direction of the mean reflected light beam, so that varying ranges of refractive indices may be measured with approximately the same sensitivity without the necessity of disassembling any parts of the instrument. This adjustability is shown schematically in FIG. 11, where light rays 210, 212 represent the position of the critical angle for two reference liquids have different refractive indices. Thus, line 210 represents the boundary between total reflection (left) and absorption (right) areas, as shown in the projected views of the light-receiving face of detector 95, for a first liquid, and the detector is positioned such that this boundary line falls midway along transducer 203. Dotted line 212 represents the critical angle boundary line for a second liquid, with the detector moved to the right to have this line also bisect transducer 203. The linear adjustability of detector 95, utilized to position transducer 203 at the appropriate position to intercept either critical angle line 210 or 212, produces a refractometer useful over a wide range of liquid refractive indices without substantial loss in sensitivity. In a representative refractometer, the maximum separation between lines 210 and 212 would be one-quarter inch, the distance between lens 182 and face 184 also one-quarter inch and the diameter of prism face 145 about three-eighths inch. The mean reflected light path from prism face 186 back to and perpendicular to detector face 200 is about 1 ⅝ inch long.

Figure 7:
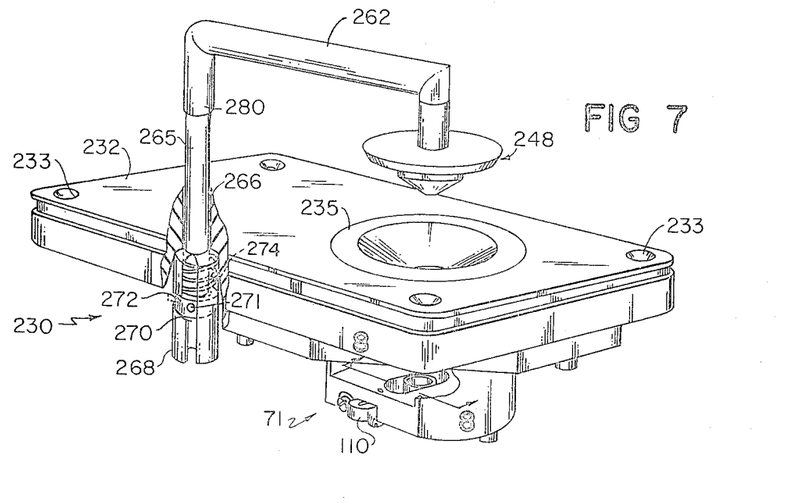
FIG. 7 is an isometric view, partially broken away, of a laboratory-type refractometer embodying the present invention.
Figure 8:
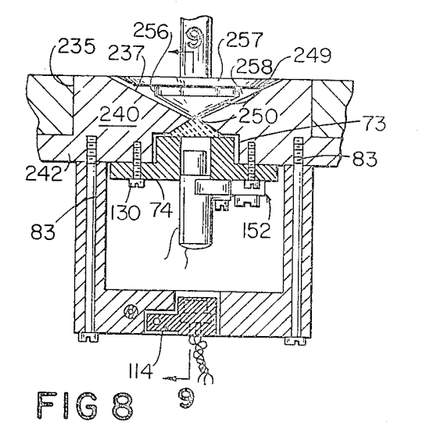
FIG. 8 is a sectional view of the embodiment of FIG. 7, along line 8—8 of FIG. 7.

Referring now to FIGS. 6 to 8, laboratory-model refractometer 230 is shown, the outer housing or carrying case having been removed. Refractometer 230 includes a mounting platform 232, having openings 233 for securing it to a carrying case, and a cylindrical opening 235 in which is seated a frustoconical sample holder 237, formed as an integral part of mounting plate 240, which has a flanged portion 242 secured, by fasteners 244, to the underside of platform 232.

Figure 9:
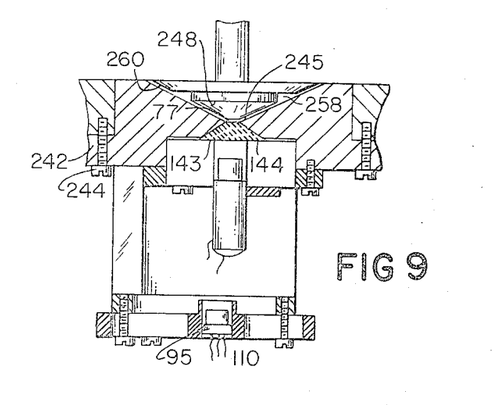
FIG. 9 is a sectional view of the embodiment of FIG. 7 through line 9—9 of FIG. 8, except with the light source and detector shown in full.

A detector mounting structure 71 supporting a detector 95 in a carrier member 115 is secured to plate 240, identically to the detector mounting in FIGS. 1-5. Similarly, light source mounting disc 74 has surfaces 143, 144 for securing and sealing prism 76, with its reflecting face 77 exposed through sample holder 237. Closure member 248 (advantageously of polytetrafluoroethylene or a similar corrosion-resistant material) has a frustoconical portion 249 sized relative to sample holder 237 to position surface 250 about one-sixteenth inch from the surface 245 of sample holder 237 to trap a liquid sample therebetween (these surfaces being shown separated in FIGS. 8, 9 for illustrative purposes only). A cylindrical portion 256 cooperates with cap portion 257 to form a channel 258 for receiving excess liquid sample. Cap 257 has an exterior conical surface 260 sized and shaped to form a lighttight seal with the adjacent surface of sample holder 237. Cover 248 is secured to U-shaped arm 262, which has its opposite end 265 telescoped, through bore 266 in platform 232, into cylinder 268, which includes a right angle notch 270 for guiding a pin 271 projecting from a collar 272 secured to the end of arm 265. A spring 274 biases collar 272 downward to the extent permitted by neck 280, which is too large to fit into bore 266. Arm 262 may be maintained in the open position by rotating it clockwise, in FIG. 6, to engage pin 271 with the horizontal portion of notch 270. The position shown in FIG. 6 can be maintained only by pulling upwardly continuously on arm 262, since release would cause pin 271, together with arm 262, to move downwardly, engaging closure 248 with sample holder 237.

The optics of the embodiment are identical to those described in FIGS. 1-5. This refractometer is operated by depositing a small single liquid sample into sample holder 237, and closing closure 248 thereupon, creating a thin film of sample liquid on prism face 77, with excess liquid squeezed into channel 258. Because of the small sample size, the liquid will quickly assume the temperature of its surroundings, and no temperature-compensating probe is necessary.

Other embodiments will occur to those skilled in the art and are within the following claims.

What is claimed is:

1. In a critical angle refractometer for measuring the refractive index of a liquid by determining the critical angle at which light is reflected through a prism from a prism surface adjacent the liquid, the refractometer having a prism with an inner surface exposed to liquid forming an interface therewith, a light source mounted on light source mounting means arranged to direct a light beam at an outer surface of said prism and through said prism to the interface of said prism surface and the liquid, an adjustable detector positioned over said outer surface of the prism to receive light reflected from said interface back through said prism, and readout means to generate an electrical output corresponding to the refractive index of said liquid, the improvement comprising detector mounting structure comprising
 a platform having linear guide means, said guide means spaced from said prism a distance further than the distance of said light source from said prism, and extending substantially parallel to said outer prism surface,
 a carrier member for said detector mounted in said linear guides for moving said detector linearly in a path substantially perpendicular to the mean reflected light path from said prism, and
 adjusting means for moving said carrier member along said linear guide means.

2. The refractometer of claim 1 wherein said detector mounting structure comprises legs extending away from the said outer surface of said prism and its associated structure, said legs spaced from each other and straddling said prism to provide a light path therebetween from said prism to said detector, said light source mounting structure is arranged between said legs and said platform is supported on the outer ends of said legs and defines said guide means.

3. The refractometer of claim 2 including a mounting plate for mounting said prism, said detector mounting legs having their ends secured to said prism mounting plate, said light source mounting structure being secured to said mounting plate and said prism mounting plate including an aperture for passing light from said light source to said prism, and back from said prism to said detector.

4. The refractometer of claim 1 wherein said detector mounting structure is secured to walls that receive heat conducted from liquid being measured, said mounting structure is of heat-conductive material, and cooling structure defining a cooling flow path is arranged to contact said detector mounting structure between said carrier member and the point of attachment of said mounting structure to said walls, thereby to protect the detector from heat.

5. The refractometer of claim 4 wherein said carrier member is of heat-conductive material and is in heat-conductive contact with said cooling structure whereby heat radiating from the region of said liquid to said carrier member is conducted away from said detector.

6. The refractometer of claim 5 wherein said heat-conducting contact is at least partially through said linear guide means and said adjusting means.

7. The refractometer of claim 2 including cooling structure comprising metallic conduits in contact with an intermediate portion of said mounting structure between said carrier member and said liquid for circulating a cooling substance continually along said mounting structure, whereby heat conducted through said legs from said liquid is substantially removed from said mounting structure prior to reaching said carrier member.

8. The refractometer of claim 2 adapted for in-line operation wherein
    said detector legs are secured to a prism mounting plate and said mounting plate is secured to means forming an opening in a liquid flow directing body to expose the interface surface of the prism to liquid therein,
    said body defines upstream and downstream conduits constructed to provide a liquid path to and from the prism,
    said upstream conduit is disposed to deliver a stream of liquid along said plate and at an acute angle to said prism surface,
    said downstream conduit is disposed to receive liquid at an oppositely directed acute angle to said prism surface, and
    said prism surface and mounting plate are positioned to deflect and redirect liquid flow from said upstream to said downstream conduits with the liquid flow path extending across said prism surface.

9. The refractometer of claim 1 for measuring the refractive index of a liquid sample, wherein said refractometer also includes a sample holder for maintaining said liquid sample upon said prism surface, and a closure member for forming with said holder and said prism surface a stray light-impermeable chamber for said liquid sample.

10. The refractometer of claim 9 wherein said sample holder defines an interior frustoconical bore, and said prism surface is located at the truncated apex of said conical bore.

11. The refractometer of claim 10 wherein said closure means includes a resilient cap having an outer surface shaped to press-fit into said conical bore to form a lighttight seal above said liquid.

12. The refractometer of claim 10 wherein said resilient cap has a lower conical portion having a surface parallel to said prism surface and sized to be spaced slightly therefrom and an outer wall matching the adjacent sample holder wall, and an upper cylindrical portion forming a channel for excess liquid sample squeezed out from between said parallel surfaces and said matching conical surfaces.

13. The refractometer of claim 9 including mounting structure for said closure member comprising a retractable arm and biasing means for biasing said closure means against said holder to form said stray light-impermeable chamber.

14. The refractometer of claim 13 wherein said arm is pivotably mounted on a bridge member remote from said sample holder, and arcuately retractable from said sample holder, and said biasing means are constructed to be inoperative when said arm is arcuately retracted from said sample holder.

15. In a critical angle refractometer for continually measuring the refractive index of a liquid stream flowing through a line by determining the critical angle at which a light beam directed through a prism at a surface of said prism exposed to and forming an interface with said stream is reflected back through said prism from said interface, the improvement comprising a one-piece stream-directing member for directing said stream along said prism surface comprising,
    a liquid inlet, a liquid outlet coaxial with said inlet, said inlet and said outlet arranged for connection in said line so that the entire liquid stream flowing through said line also flows through said stream-directing member,
    an upstream conduit arranged to deliver said liquid stream from said liquid inlet in to said prism surface at an acute angle to said prism surface,
    a downstream conduit arranged to deliver said liquid stream from said prism surface to said outlet at an oppositely directed acute angle to said prism surface,
    a smooth, continuous surface joining said conduits and shaped to define a weirlike diverter member between said conduits, the liquid flow path between said conduits being across said diverter member, and
    means mounting said prism with said exposed prism surface located opposite to and facing said diverter member whereby the liquid stream flowing across said member between said conduits flows across said prism surface and is deflected and redirected by said prism surface.

16. The refractometer of claim 15 wherein said stream-directing member is a standard valve body.

17. The refractometer of claim 15 wherein said prism mounting means is constructed to define an opening of frustoconical cross section having said prism surface secured at its truncated apex opposite said weirlike diverter member, said stream-directing member and said opening being structured to provide a relatively smooth liquid flow path.

18. The refractometer of claim 15 wherein said upstream and downstream conduits of said stream-directing member are formed integrally each of said conduits includes a portion of circular cross section adjacent the respective liquid inlet and outlet openings, the conduits being sloped outwardly at opposed angles from their respective openings, the outer walls of said conduits terminating in a common portion of circular cross section perpendicular to and of greater diameter than either of said inlet or outlet openings, and the inner walls of said conduits joined together to form said weirlike diverter member.

19. The refractometer of claim 17 wherein said prism mounting means and said stream-directing member being secured together, in a liquidtight seal, by flanges having parallel sealing surfaces extending radially outwardly from the base of said conical opening and from the adjoining portion of said stream-directing member.

20. In a critical angle refractometer for continually measuring the refractive index of a liquid stream flowing through a line by determining the critical angle at which a light beam directed through a prism at a surface of said prism exposed to and forming an interface with said stream is reflected back through said prism from said interface, the improvement comprising a one-piece stream-directing member for directing said stream along said prism surface comprising,
    a liquid inlet and a liquid outlet, said inlet and said outlet arranged for connection in said line so that the entire liquid stream flowing through said line also flows through said stream-directing member,
    an upstream conduit arranged to deliver said liquid stream from said liquid inlet in to said prism surface at an acute angle to said prism surface, a downstream conduit arranged to deliver said liquid stream from said prism surface to said outlet at an oppositely directed acute angle to said prism surface, each of said conduits including a portion of circular cross section adjacent the respective liquid inlet and outlet openings, the conduits being sloped outwardly at opposed angles from their respective openings, the outer walls of said conduits terminating in a common portion of circular cross section perpendicular to and of greater diameter than either of said inlet or outlet openings and the inner walls of said conduits joined together to form a smooth, continuous surface, said surface being shaped to define a weirlike diverter member between said conduits, the liquid flow path between said conduits being across said diverter member, and means mounting said prism with said exposed prism surface located opposite to and facing said diverter member whereby the liquid stream flowing across said member between said conduits flows across said prism surface and is deflected and redirected by said prism surface.

* * * * *

UNITED STATES PATENT OFFICE
CERTIFICATE OF CORRECTION

Patent No. 3,628,867          Dated December 21, 1971

Inventor(s) Tyson H. Brady

It is certified that error appears in the above-identified patent and that said Letters Patent are hereby corrected as shown below:

Col. 2, line 3, change "light" to --liquid--.

Signed and sealed this 20th day of June 1972.

(SEAL)
Attest:

EDWARD M. FLETCHER, JR.                    ROBERT GOTTSCHALK
Attesting Officer                          Commissioner of Patents